United States Patent Office 2,957,266
Patented Oct. 25, 1960

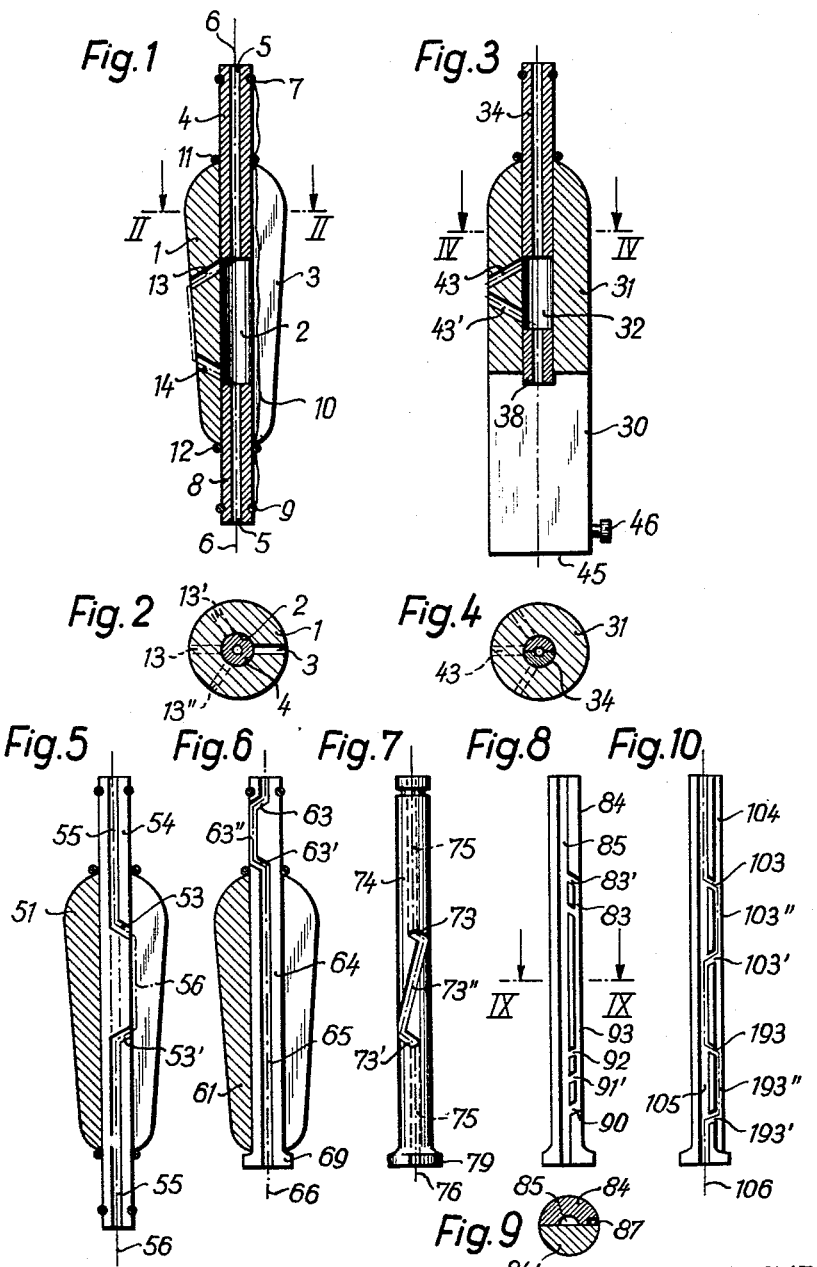

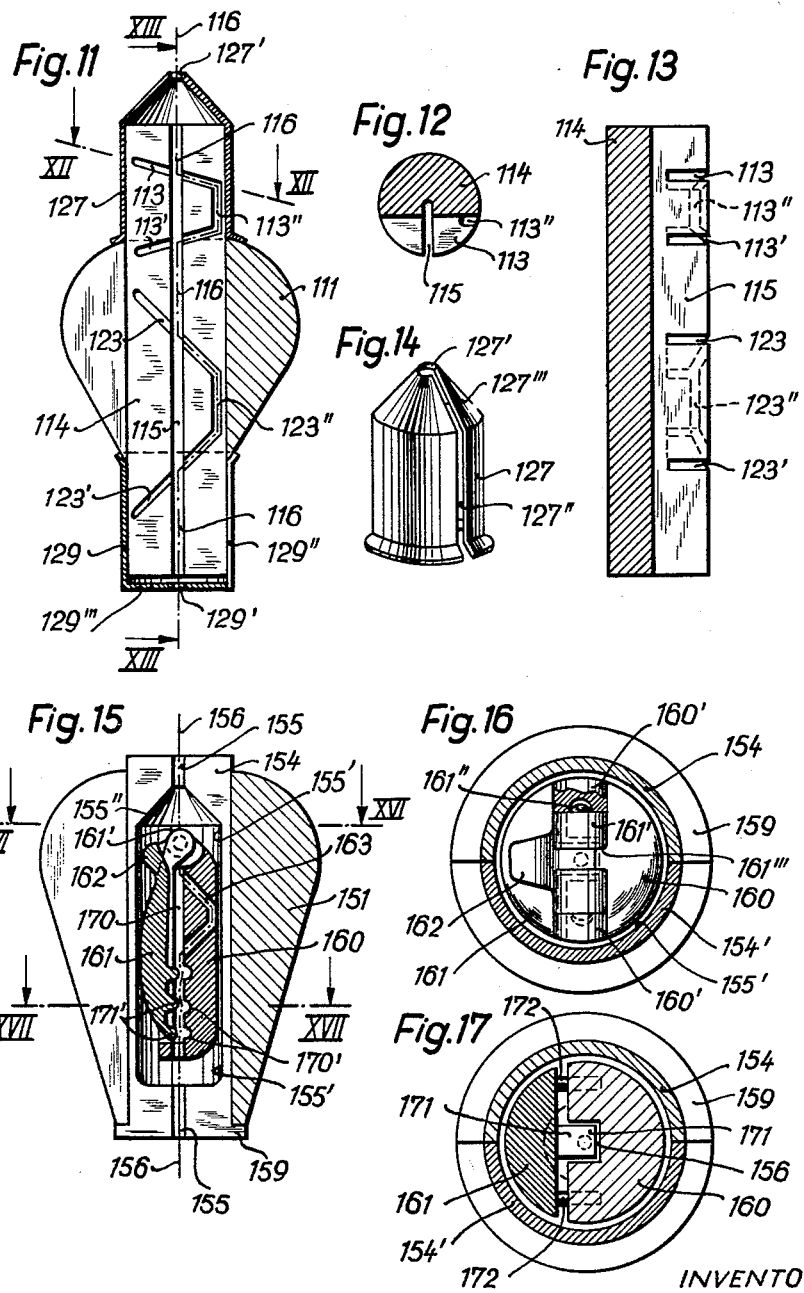

2,957,266
FISH LINE FLOAT

Liselotte Pfister, nee Siewerth, Stiller Grund, Ertingen, Saulgau, Baden-Wurttemberg, Germany Filed Nov. 30, 1956, Ser. No. 625,483

Claims priority, application Germany Dec. 2, 1955

9 Claims. (Cl. 43—44.88)

This invention relates to improvements in or to fishing line float structures.

There have been known numerous float structures which are provided with a tubular line guide piece to be inserted into a longitudinal bore of the float and be tightly fitted therein.

It was customary in the past to slip on this line guide piece another device consisting of several telescoped sleeves and of an additional line guide body for measuring the depth of the water at the location of fishing, wherein the fishing line was guided at a sharp angle.

When the line was cast, the float remained on the surface of the water while the fishing line, being unilaterally pulled by the weight of the lead or the like, ran freely through the line guide until the lead had reached the bottom of the water. When the fathom line was pulled in again, the line was tightened due to the pull now being exerted on it from both sides and frictionally bound in the angular guide thereby causing the measuring device to be bound in its last position on the line. The end of the line which protruded from the measuring device then indicated the depth of the water.

The depth measuring device known to the art had several disadvantages. Since it consisted of several parts that had to be fitted into each other, it was complicated and expensive to produce. The adjustment of this device to different thicknesses of lines was also very complicated and had to be done with great care. In addition, the measuring device which was merely slipped on the line guide piece often became detached from the line guide when the line was cast, thereby falsifying the measuring result, or its flywheel mass caused the line to become entangled.

The invention eliminates these and other disadvantages in that the channels or passageways required for producing the angularly arranged line guide are disposed in the float body and in the line guide piece itself. The invention permits to arrange in the float body or in the line guide piece several ducts or passageways of different diameters for various line thicknesses or of different inclinations to the longitudinal axis of the float and the line guide piece in order to produce varying effects of frictional binding.

It is therefore an important object of the present invention to provide means affording the construction of an effective fish line float which fulfills all practical requirements, is inexpensive to manufacture, easy to handle and not subject to disturbances during use.

These and other objects of the invention will become further apparent from the following detailed description, reference being made to the accompanying drawings showing preferred embodiments of the invention, in which:

Fig. 1 is a longitudinal axial section of a float with a two-part line guide according to the invention;

Fig. 2 is a vertical section taken along line II—II of Fig. 1;

Figs. 3 and 4 are likewise a longitudinal section and a vertical section taken along line IV—IV of a depth measuring device connected to a bait receiver;

Figs. 5 and 6 show, respectively, longitudinal sections of two embodiments of a float according to the invention, the line guide piece traversing the entire length of the respective float;

Fig. 7 is an elevational view of a line guide piece embodying the invention;

Fig. 8 shows a line guide piece consisting of two portions joined along the longitudinal median plane;

Fig. 9 is an enlarged vertical section taken on line IX—IX of Fig. 8 with the line guide piece in assembled position;

Fig. 10 is an elevational view of another line guide piece, which is longitudinally divided;

Fig. 11 shows another line guide piece for a longitudinally divided float with end caps;

Fig. 12 is a section taken on line XII—XII of Fig. 11;

Fig. 13 is a longitudinal sectional view taken on line XIII—XIII of Fig. 11;

Fig. 14 is a schematic view of an end cap for the line guide body;

Fig. 15 is a longitudianl section through another float with longitudinally divided line guide piece and clamping means for the fish line;

Figs. 16 and 17 are respective vertical sections on an enlarged scale taken on lines XVI—XVI and XVII—XVII of Fig. 15.

Referring now more particularly to Figs. 1 and 2, there is shown and disclosed a float body which may be made of cork, plastic or like material and which is provided with a longitudinal bore 2, has a longitudinal slit 3 so that it can be spread open transversely to this slit. From the top, there is inserted in the longitudinal bore 5 of a tubular line guide or channel piece 4 fitted in bore 2, a line 6 passing through channel or guide piece 4. A circular groove which receives an elastic snap spring or spreader ring 7 is arranged on the upper end of the line guide piece 4. A second line guide channel piece 8, which also carries a spring ring 9 on its lower end, is inserted into the lower end of the longitudinal bore 2 of the float. The two spring rings 7 and 9 are connected to each other by a stretched cord 10, which runs in the slit 3 of the float 1. This cord 10 prevents the two line guide pieces 4 and 8 to become detached from the float. In addition, an elastic clamping ring 11 and 12, which limits the extent to which the line guide piece may be put in, is axially displaceably stuck on each of the two line guide pieces 8 and 9. Instead of using spring or clamping rings, it is possible to use elastic clamping sleeves which are stuck on by clamping action. The line guide pieces 8 and 4 may have one and the same, tubular cross section throughout or they may consist of two halves, the dividing plane of which runs through their longitudinal axis. In the latter case, the two tubular halves are held tightly together by the clamping effect of the float 1 and the spring rings 7, 11 and 8, 12.

The float 1 comprises further grooves or radial channels 13 and 14, which, sloping in opposite directions (from a higher location to a lower location and from a lower location to an upper location) and running obliquely to the longitudinal axis of the float, open into that portion of the longitudinal bore 2 of the float which lies intermediate the two line guide pieces 4, 8, and jointly form angular guide channel means for the fishing line 6. As shown by Fig. 2, the periphery of the float 1 may be provided with several channels or bores 13, 13', 13'', which may have different inner diameters corresponding to different thicknesses of lines or may have different inclinations to the longitudinal axis of the float corresponding to the desired clamping effect of the angular guide means. It is readily apparent that the device just described can be produced and handled in a considerably simpler manner than the depth measuring device known to the art, which could never be pulled through water plants without there being a misreading due to the forced displacement of the float on the line.

In operation, when the float is cast, the sinker on the end of line 6 will pull said line through the float which will be held in position on the water by the buoyant force of the water. Then when the line is pulled in, the float will retain its position on the line and move therewith, and the length of the line between the retained float and the sinker will indicate the depth of the water.

In the embodiment shown in Figs. 3 and 4 the depth measuring device is combined with a cup-shaped bait receiver 30, which accommodates the hook and bait when the line is cast. The bait receiver encloses the float 31 which is firmly inserted therein and is provided with a longitudinal bore 32. The upper line guide piece 34 is constructed like line guide piece 4 of Fig. 1, while the lower line guide piece 38 is substantially shorter and protrudes only slightly beyond float 31 in order not to reduce the space designed for receiving bait. 43 and 43' are the upper and lower channels or passageways forming angular guide means for the fishing line. A hook, knob or the like 46 is disposed close to the lower edge 45 of the bait receiver 30. The line for casting may be fastened to same in order to maintain the bait receiver in the right position. In this case, the line guide piece 34 may be made of a single piece of material or it may be composed of two symmetrical halves, as indicated in Fig. 4. Likewise, there may be angular guide channels 43, 43' of different widths and/or different inclinations.

Whereas the line guide of the embodiments shown in Figs. 1 to 4 consists of two coaxially disposed portions 4, 8 or 34, 38 arranged equi-distantly and in succession, the line guide of the embodiments which follow is formed by a guide piece which penetrates the entire length of the float and is preferably longitudinally divided. In addition, the angular guide channels (passageways) of these embodiments are no longer disposed in the float, but in the line guide pieces themselves.

In Fig. 5, the longitudinally divided line guide piece 54, which is passed through the float 51, is provided with a longitudinal channel 55, from which the angular guide passageways or channels 53, 53' branch off. The fishing line 56, which leads from channel 53 and returns again into the longitudinal channel 55 through channel 53', runs between the orifice of the two angular channels on the outside of the line guide piece 54 in the longitudinal slit of the float 51. But it could also run in a longitudinal groove or passageway recessed in the periphery of the line guide piece 54, as is shown, for example in Figs. 8 and 10.

The center channel 55 may run continuously or, as shown in Fig. 5 may be omitted between the two angular channels 53, 53'. The center channel of the line guide piece 54 may pass therethrough uninterruptedly or may be, as shown in Fig. 5, composed of upper and lower channel sections.

In the embodiment shown in Fig. 6, the angular guide channels 63, 63', which branch off from the center channel 55, are not disposed on that portion of the line guide piece 64 which is inside the float, but on the portion which is above the float. In addition, the outer orifices of the two angular channels 63, 63' are connected by a longitudinal channel 63'', wherein the line 66 runs. The lower end of the line guide piece 64 is provided with a thickening 69, which serves as a stop when the line guide piece 64 is inserted into the float 61.

In the embodiment shown in Fig. 7 the angular channels 73, 73', which lead outwardly from the center channel 75 of the line guide piece 74, are connected by an oblique channel 73'' which is worked from without into the outer surface of the line guide piece 74. This oblique channel 73'' receives the fishing line 76 without the latter being frictionally bound by the float which surrounds the line guide piece. This embodiment also provides for a stop 79 on the lower end of the line guide piece for limiting the insertion of the latter into the float body (not shown).

In the embodiment shown in Fig. 8, several angular channels 83, 83' and 90, 91', 92 branch off from the center channel 85 of the line guide piece 84. These angular channels may have different widths or inclinations in order to render it possible to adjust the clamping effect of the angular guide to the line used. All these angular channels are connected to each other by longitudinal channel 93 in and along the periphery of the line guide piece 84.

Whereas the prior art was only familiar with the method of composing the cross section of the line guide piece of two (mirror-like) symmetrical halves, each of which comprises one half of the cross section of the longitudinal channels, Fig. 9 shows that the guide cross section can advantageously also be composed of two portions 84 and 84', the dividing plane of one of which comprises the full cross section of the channels, while the other displays a smooth parting plane.

Fig. 10, finally, shows another embodiment, wherein the line guide piece 104 is provided, in addition to the center channel 105, with two groups of angular channels 103, 103' and 193, 193', which are connected with each other by a longitudinal channel 103'' and 193'', respectively, along the outside surface of the line guide piece 104. This double angular guide is particularly useful when thin fishing lines are used, in order to produce sufficient friction. If the use of these two angular guides produces too much friction, one of the two angular guides (for example, 193, 193'', 193') may remain unused by allowing the line 106 to run rectilinearly through the center channel 105 and then through and beyond the first angular guide 103, 103'', 103'.

The embodiments shown in Figs. 5 to 10 can, of course, be used with equal advantage both in simple floats as well as in conjunction with bait receivers (Fig. 3).

Figs. 11 to 14 show another embodiment of a float 111, into which a one-piece line guide piece 114 is inserted, whose line guide channels are formed exclusively by grooves running from the outside toward the inside. Thus, the center channel 115 for the fishing line 116 is formed by an axial longitudinal slit, which extends from the outside to the center of the axis of the line guide body (Figs. 12 and 13). The angular guide channels 113, 113' and 123, 123' are formed by oblique slits which are also formed from the outside (Figs. 11, 12 and 13). The two angular guide channels 113 and 113' are connected to each other by a longitudinal slit 113'' which runs on the outside of the line guide piece 114. The oblique guide slits 123 and 123' are connected by a longitudinal slit 123''. The fishing line 116 is guided exactly centrically by two end caps 127 and 129. These end caps are, respectively, provided with a central guide hole 127' and 129' and with a spring slit 127'' and 129''. The outer extremities of the end caps may be provided with a cone 127''' (Fig. 13) or with a plane bottom 129''', which contains the central guide openings 127' and 129', respectively. The end caps are placed or slipped onto the two ends of the line guide piece 114 in such a manner that their spring slits 127'' and 129'' do not coincide with the longitudinal slit 115 but are preferably displaced at an angle of 180°.

The embodiment shown in Figs. 15 to 17 refers to a float body 151, through which is passed a central line guide piece which consists of two symmetrical parts 154, 154', i.e., as the guide piece is longitudinally divided. A stop 159 arranged on the lower end of the line guide piece 154 rigidly connects the latter in the direction of pull of the line 156 to the float 151. The line guide piece 154 comprises a center channel 155, which is enlarged to form a cylindrical chamber 155' between its upper and its lower end. The chamber 155' is provided with a conical-shaped portion 155'' on its upper end. A clamping stop, which acts automatically when the line is pulled, is arranged in the chamber 155', through which the line 156 runs. This clamping stop consists of two forked legs 160 and 161, the upper ends of which are flexibly connected to each other in any manner whatever, so that their lower ends can be spread apart or moved toward each other. The two legs may thus simply be connected to each other by two hairpin-shaped, bent spring clips, whereby one end of each spring clip is fastened on or in one of the legs, while the other end of each spring clip is fastened on or in the second leg. If the legs are made of thermoplastic material, the ends of the spring clips may be pressed or injection-molded into same when the legs are produced.

In the embodiment shown in Figs. 15 and 16, the upper end of the forked leg 160 is provided with two bearing eyes 160', between which a space or gap is left free which is engaged by a bearing lug 161', which is disposed on the upper end of the second forked leg 161. Each of the outer surfaces of the bearing lug 161' is provided with a pin, knob or boss 161'', which as pivots can come to rest in a corresponding hollow on the inner surface of one of the bearing eyes 160' which face it (Fig. 16).

The bearing lug 161' is also provided with a cut out 161''' which leaves a free passage for the line 156 at any position of the two forked legs. The leg 161 is further provided with a cam 162, which cooperates with the inner cone 155'' of the two-part line guide piece 154, 154'. An angular guide passageway 163 for the fishing line 156, which only offers little resistance when the line is running off, is arranged in the leg 160 of the clamping stop. But when the line is hauled in or reeled up, there is considerable frictional resistance in the angular guide passageway 163. Consequently, the clamping stop 160, 161 is pulled against the inner cone 155'' of the line guide 154, 154'. In so doing, the cam 162 strikes against the funnel wall of the inner cone 155'' and swings the leg 161 against the leg 160 thereby causing the lower ends of the two forked legs to be pressed against one another. The inner surface of the leg 160 is provided with a longitudinal groove 170, through which the fishing line 156 runs. This groove 170 is engaged by a longitudinal rib 171 which is arranged on the lower end of the forked leg 161 and which is designed to exert a clamping action on the line which is running between the two forked legs. (Fig. 17). Instead of having a continuous longitudinal rib 171, the leg 161 may be provided with several teeth or protuberances 171' placed one after another, which engage with corresponding recesses 170' of the groove 170 of the leg 160 forming with same a zigzag guide for the fishing line. By pressing together the two forked legs 160, 161 the line is, therefore, frictionally bound or firmly clamped, making a displacement of the float on the fishing line impossible, even if the float is caught in water plants or the like.

In order to permit the clamping stop to open automatically when the tension of the line slackens, the invention further provides elastic means which tend to press the two legs 160, 161 apart. If the two legs 160, 161 are articulatedly connected to each other by means of spring clips, as has been described above, these spring clips may simultaneously be used as spreading springs for spreading the forked legs apart. In the embodiment shown in Figs. 15 to 17, two leaf springs 172 are fastened to the leg 160, which exert a spreading effect on the other leg 161. It is equally possible to arrange a helical spring between the two forked legs or a torsion spring adjacent its joint.

The clamping stop may also be constructed in such a manner that the joint of the two jaws is at their lower end while its open jaw points upwardly.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A fishing line float having a bore formed therethrough, a line guide piece constructed for central location within said bore, said line guide piece being provided with at least one longitudinal guide channel for permitting passage of the line therethrough, and at least two angularly directed guide channels in communication with said longitudinal guide channel, one of said guide channels extending upwardly and outwardly while the other of said guide channels extends downwardly and outwardly, at least the major portion of said longitudinal guide channel and said angular guide channels being located within said float when said line guide piece is inserted therein, whereby said line may pass through said longitudinal guide channel and said angular guide channels and, when weighted by a sinker and when the float is placed in a body of water, will freely move through said guide channels in one direction and upon exerting a pull on the line in an opposite direction will drag along with itself said guide piece and said float through engagement with said angular guide channel, thus indicating the depth of the water at which said sinker is located, while said float remains on the surface of the water.

2. In a float according to claim 1, including a plurality of longitudinal guide channels spaced from each other in said line guide piece, said angularly directed guide channels extending from one of said longitudinal channels to another of said longitudinal channels in a downwardly directed slant.

3. In a float according to claim 2, said longitudinal guide channels being of different diameters for lines of corresponding thicknesses.

4. In a float according to claim 1, including a plurality of longitudinal guide channels aligned with each other, said angularly directed guide channels being located intermediate said longitudinal guide channels.

5. In a float according to claim 4, wherein at least one of said longitudinal guide channels is located in the outer surface of said line guide piece.

6. In a float according to claim 1, said line guide piece being composed of two half-cylindrical portions, said one longitudinal guide channel extending through one of said half-cylindrical portions and centrally thereof.

7. A float according to claim 1, said elongated line guide means being provided with two adjacent portions hinged to each other at one of their ends, and interengageable clamping means, respectively, provided on adjacent faces of said portions and remote from said one end thereof.

8. A fishing float comprising body having a bore, a centrally located guide piece within said bore and provided with a longitudinal line guide channel, upper and lower angularly directed line guide channels in communication with said longitudinal channel, said upper guide channels being directed from a higher location of said longitudinal guide channel to a lower location on the outside of said guide piece, said lower guide channels being directed from a higher location on the outside of said guide piece to a lower location of said longitudinal guide channel.

9. A fishing float according to claim 8, said guide piece being formed of two half-cylindrical complementary portions, said angularly directed guide channels being disposed in only one of said half-cylindrical portions.

References Cited in the file of this patent

UNITED STATES PATENTS

| | | |
|---|---|---|
| 250,848 | Smith | Dec. 13, 1881 |

FOREIGN PATENTS

| | | |
|---|---|---|
| 270,758 | Switzerland | Feb. 16, 1951 |